Oct. 14, 1930.                J. F. LAMB                1,778,263
                        ELECTRICAL COOKING DEVICE
                    Filed May 10, 1929      2 Sheets-Sheet 1

Inventor
Joseph F. Lamb
By N. Clay Lindsey
his Attorney

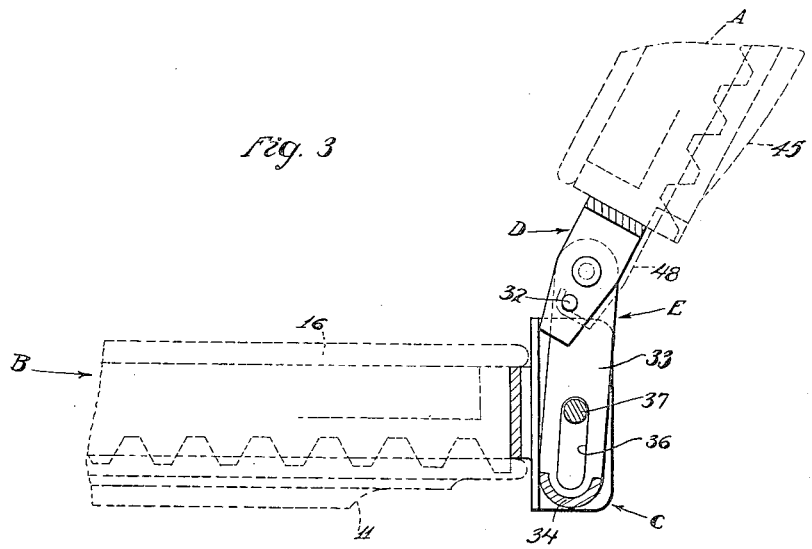
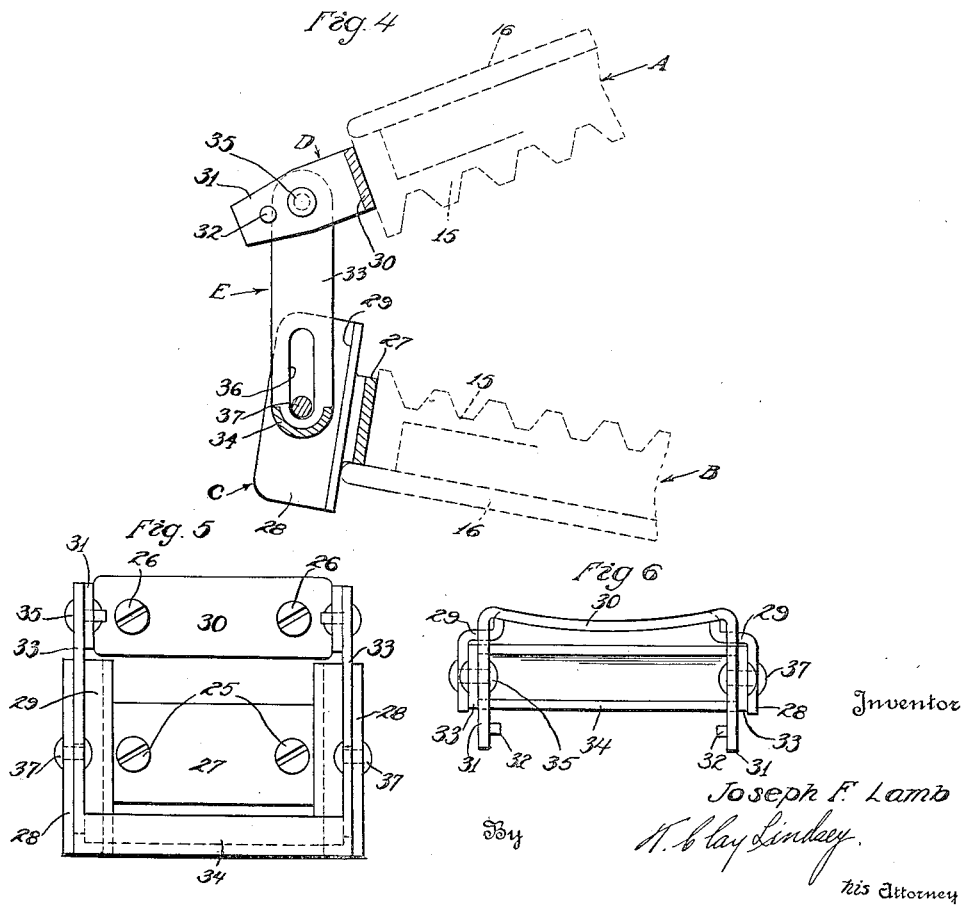

Patented Oct. 14, 1930

1,778,263

UNITED STATES PATENT OFFICE

JOSEPH F. LAMB, OF NEW BRITAIN, CONNECTICUT, ASSIGNOR TO LANDERS, FRARY & CLARK, OF NEW BRITAIN, CONNECTICUT, A CORPORATION OF CONNECTICUT

ELECTRICAL COOKING DEVICE

Application filed May 10, 1929. Serial No. 361,890.

The present invention relates to an electrical cooking device and has as its object the provision of an arrangement by means of which various articles or kinds of food may be conveniently cooked.

More particularly, an aim of the invention is to provide a cooking appliance which may be employed for making waffles when the units are in one position, or for making pancakes when the units are in another position, and which may also be used as a hot plate or employed as a stove for heating various cooking utensils or pots.

A further aim of the invention is to provide a device of this sort which may be used for various cooking operations, which may be very quickly and easily adjusted for the particular cooking operation to be performed, which is relatively simple in construction and arrangement, and which is pleasing in appearance.

A still further aim of the invention is to provide an improved hinge connection between the two units of the device which will permit these units to be readily reversed relative to one another; permit the upper unit to automatically parallel itself with the lower unit; permit of toasting sandwiches and other foods of varying thicknesses, and which will permit of adjustment of the grids when cooking waffle batter.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein is shown one of the many embodiments which the present invention may take:

Fig. 3 is a detail view showing the arrangement of the parts when the upper unit is in raised or inoperative position;

Fig. 4 is a detail view showing the manner in which the units are reversed relative to one another;

Fig. 5 is a rear elevational view of the hinge for connecting the units; and

Fig. 6 is a top plan view of the hinge.

Figure 1:
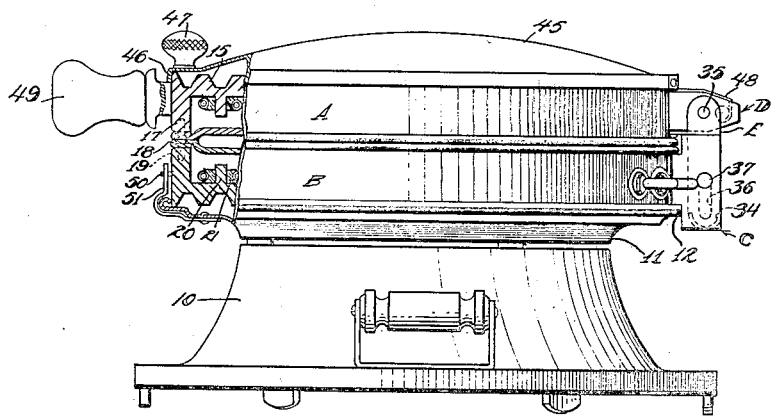
Figure 1 is a side elevational view of the complete device with portions in section for purposes of illustration.
Figure 2:
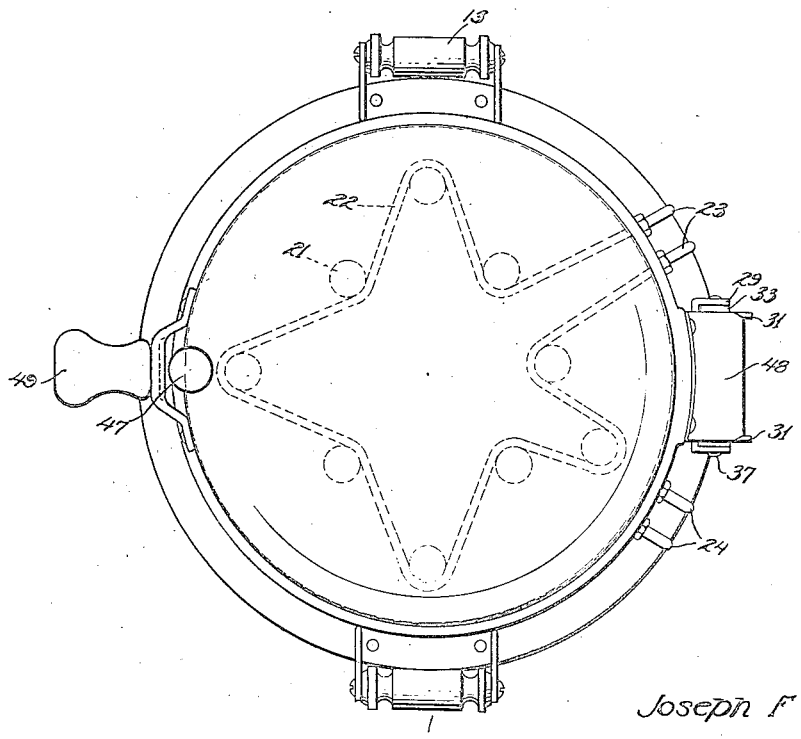
Fig. 2 is a top plan view thereof.

Referring to the drawings in detail, my improved device includes a pair of heating units designated generally by the letters A and B. These units are supported by a suitable support which, in the present instance, includes a sheet metal base 10 to the top of which is secured, in any suitable manner, a sheet metal tray 11, the edge of which is curled so as to provide a bead 12. The lower unit B, in either of its positions, is adapted to rest upon the tray 11 within the bead 12, as shown most clearly in Fig. 1. The base 10 may be provided, at opposite sides, with suitable handles 13.

The two units A and B are, by preference, generally similar in construction and arrangement, and a description of one will apply to the other. Each unit includes a pair of heating plates 15 and 16, one of these plates, in the present instance that designated by the numeral 15, having on its external surface projections similar to those with which the heating plates of waffle irons are usually provided. The other plate 16 has a smooth external surface. These plates 15 and 16 are parallel to each other and are held in spaced apart relation by a suitable rim or ring 17, this ring, in the present instance, being cast integrally with the waffle heating plate 15. The heating plate 16 is preferably formed of sheet metal and has its edge turned back upon itself as at 18. The turned over edge of the plate is adapted to engage against the end of the ring or flange 17 and is connected thereto in any suitable manner as by means of screws 19. The central portion of the plate 16 is depressed or set inwardly of the rim or edge of this plate in order that, when the units are in the position shown in Fig. 1, the two opposed plates 16 and 16 are spaced apart so as to accommodate the batter to be cooked therebetween. The two units are shown, in the present illustrative disclosure, as being circular but, obviously, they may be of any suitable shape.

Each unit A and B has an electrical heating element (or elements), and this element is preferably carried by the waffle heating plate 15 in a manner similar to that disclosed in my Patent No. 1,468,385 granted September 18, 1923, for electrically heated device. Extending from the inner surface of each plate 15, and preferably cast integrally therewith, are a plurality of staggeredly arranged projections 20 about which are positioned electrical insulating bushings 21 preferably made of a good heat conducting material. The heating elements 22 are preferably in the form of coiled wires looped, under tension, about the insulators in zig-zag fashion. The ends of the heating element 22 of the upper unit A are connected to terminal pins 23 preferably located to one side of the hinge, and the ends of the element associated with the lower unit B are connected to the terminal 24 preferably located to the other side of the hinge. These pairs of terminal pins are adapted to receive the usual electrical plugs (not shown) which may be carried in parallel on the end of a conducting cord. It will be observed that the space between the plate 15 and the plate 16 is free of heat insulating material so that the heat, when desired, may be conducted by the air within this space from the heating element to the heating plate 16.

The two units are pivotally connected together in such manner that either the plates 16 or the plates 15 may be brought into opposed or adjacent position depending upon the particular cooking operation to be performed, and the upper unit A may be supported in raised position when it is desired to have access to the then upper surface of the lower unit. This hinge is preferably located between the pairs of terminal pins 23 and 24 and at what may be termed the rear ends of the units. The hinge includes a bracket C connected to the lower unit as by screws 25; a bracket D connected to the upper unit A as by means of screws 26, and a yoke E pivotally connected to the bracket D and pivotally and slidably connected to the bracket C. The bracket C has a central curved attaching portion 27 abutting against the periphery of the flange 17 and secured thereto by the screws 25. At each end of the attaching portion is a rearwardly extending vertical flange 28, there being an offset between each of these flanges and the attaching portion so as to provide vertical shoulders 29. The bracket D has an attaching portion 30 and a pair of rearwardly extending arms 31 carrying, adjacent their free ends, inwardly extending pins 32. The yoke member E has a pair of side links 33 connected at their lower ends by a cross portion 34 of semi-cylindrical shape. The upper ends of the links 33 are pivotally connected to the arms 31 between their ends by pivots or rivets 35. The links, adjacent their lower ends, have longitudinally extending slots 36 and, extending through these slots and the respective flanges 28 of the bracket C, are pivots or rivets 37.

For the purpose of enclosing the upper end or surface of the upper heating unit A, when that surface is not in use as a hot plate or stove, there is provided a removable cover 45 preferably formed of sheet metal and having a circumferential skirt 46 adapted to fit about the edge of the upper plate. At the forward end of the cover is a knob or handle 47 for removing and positioning the cover. Secured to the rear end of the cover is a sheet metal clip 48, the rear end of which is turned downwardly and inwardly so as to form a hook adapted to receive the pins 32. The upper unit may be provided at its forward end with a forwardly extending handle or knob 49 by means of which the upper unit may be raised, lowered and reversed. If desired, the lower unit may have, at its forward end, a pin 50 adapted to take into a hole in a piece 51 suitably secured to the tray 11.

The operation of the device will be readily understood from the foregoing description taken in connection with the accompanying drawings. Assuming that a batter is desired to be cooked between the two flat heating plates, the units are positioned, as shown in Fig. 1, with these plates 16 opposed, the rim of the upper plate resting upon the rim of the lower one. To place the batter upon the lower plate 16, the knob 49 is grasped, and the upper unit is moved upwardly to the position shown in Fig. 3 and in which position the rear ends of the arms 31 engage the shoulders 29. After the batter is positioned upon the lower plate, the upper unit is thrown down to the position shown in Fig. 1. Owing to the pin and slot connection between the yoke E and the bracket C, the upper unit may automatically accommodate itself with respect to the lower unit. The heat generated by the electricity passing through the heating elements will be conducted or radiated to the plates 16, it being apparent that, as the batter takes the heat away from the plates 16, there is a tendency for the heat to flow to those plates from the heating elements.

If it is desired to cook waffles, each of the units is inverted and, in this operation, the cover 45 is removed and the units are removed from the tray 11 and the rear hinged ends of the units are drawn apart so that the pins 37 engage in the lower ends of the slots 36, the lower end of the yoke E will clear the shoulders 29, and the rear ends of the arms 31 will also clear those shoulders. Then the lower unit is swung downwardly and backwardly through 180°, and the upper unit is thrown upwardly and backwardly through 180°, as will be most clearly understood from Fig. 4. After the waffle heating plates 16 are brought to opposed position, the plates are moved towards one another so that the yoke will take the same relative position with respect to the lower bracket C as that shown in Fig. 3. The units are then positioned upon the tray 11, the lower heating plate 16 being received within the rim or bead 12. The cover 45 is positioned in place. Cooking of waffles can now be proceeded with in the same manner as was the cooking of the pancakes when the units were in the original position. The heat generated by the heating elements will be, in part, conducted to the surfaces with which the batter is in engagement through the bushings 21 and the projections 20 and, in part, through the air surrounding the heating elements. If it is desired to use the uppermost plate as a hot plate for frying eggs, for instance, the cover 45 may be removed, or the upper plate may receive a cooking utensil such as a coffee pot or the like.

It will thus be seen that there is provided a very simple arrangement with which a variety of cooking operations may be conveniently carried out.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In an electrically-heated device, a pair of units of similar construction and each having a pair of heating plates and an electrical heating element between the plates and adapted to heat the same, and a hinge connection between said units arranged to permit said units to be inverted relative to one another.

2. In an electrically-heated device, a pair of units of similar construction and each having a pair of plates, the cooking surface of one plate of each unit being provided with projections and the cooking surface of the other plate of each unit being devoid of projections, each of said units having an electrical heating element between and adapted to heat said plates, and means hingedly connecting said plates together whereby either the plates provided with projections or the plates devoid of projections may be brought into opposed relation.

3. In an electrically-heated device, a pair of units each having a pair of heating plates with cooking surfaces facing in opposite directions, the cooking surface of one plate of each unit being provided with projections and the cooking surface of the other plate of each unit being devoid of projections, each of said units having a space between its plates and a heating element within said space and supported on the inner face of one of the plates, and a hinge pivotally connecting said members together so as to permit said units to be relatively inverted.

4. In an electrically-heated device, a pair of units each having a pair of parallel spaced-apart heating plates and an enclosed space between said plates, each unit having a heating element between said plates and in heating relation thereto, and a hinge between said units permitting said units to be inverted relative to one another, said hinge being provided with means whereby the upper unit may be held in raised position.

5. In an electrically-heated device, a pair of units each having a pair of parallel spaced-apart heating plates and a heating element between said plates and in heating relation thereto, and a hinge member pivotally connected to one of said units and pivotally and slidably connected to the other of said units so as to permit said units to be relatively inverted.

6. In an electrically-heated device, a pair of units each having a pair of parallel spaced-apart heating plates and a heating element between said plates and in heating relation thereto, and a hinge member pivotally connected to the lower of said units, said lower unit having a shoulder against which said hinge member is adapted to engage, and said upper unit having a stop adapted to engage said shoulder for holding said upper unit in raised position.

7. In an electrically-heated device, a pair of units each having a pair of parallel spaced-apart heating plates and a heating element between said plates and in heating relation thereto, a bracket extending from said upper unit, a second bracket connected to the lower unit and having a vertical shoulder, a hinge member pivoted to said first bracket between its ends, and a pin and slot connection between said hinge member and the second bracket.

8. In an electrically-heated device, a pair of units each having a pair of spaced heating plates and electrical heating element between and in heating relation to said plates, and a hinge attached to said units for pivotally connecting the same together so that the units may be inverted relative to one another; a support adapted to removably receive the lower of said units, and a removable cover about the upper end of the upper unit.

JOSEPH F. LAMB.